US006381049B1

(12) United States Patent
Xu et al.

(10) Patent No.: US 6,381,049 B1
(45) Date of Patent: Apr. 30, 2002

(54) MULTI-PORT OPTICAL MULTIPLEXER ELEMENT

(75) Inventors: David J. Xu; Sami T. Hendow, both of Sunnyvale, CA (US)

(73) Assignee: Ditech Corporation, Mountain View, CA (US)

( * ) Notice: Subject to any disclaimer, the term of this patent is extended or adjusted under 35 U.S.C. 154(b) by 0 days.

(21) Appl. No.: 08/990,421

(22) Filed: Dec. 15, 1997

(51) Int. Cl.$^7$ .......................... H04B 10/00; H04B 10/12
(52) U.S. Cl. ...................... 359/127; 359/124; 359/130
(58) Field of Search ................................ 359/124, 127, 359/131, 128, 129, 130, 143, 193

(56) References Cited

U.S. PATENT DOCUMENTS

| 5,604,627 A | | 2/1997 | Kohn ........................... 359/341 |
|---|---|---|---|
| 5,633,741 A | | 5/1997 | Giles ........................... 359/124 |
| 5,652,814 A | * | 7/1997 | Pan et al. ...................... 385/24 |
| 5,737,104 A | * | 4/1998 | Lee et al. ...................... 359/124 |
| 5,859,717 A | * | 1/1999 | Scobey et al. ................ 359/124 |
| 5,875,272 A | * | 2/1999 | Kewitsch ....................... 385/37 |
| 5,903,371 A | * | 5/1999 | Arecco et al. ................ 359/119 |
| 6,055,347 A | * | 4/2000 | Li ................................. 385/34 |

OTHER PUBLICATIONS

Specification Pages for: "Filter Wavelength Division Multiplexers 980/1550 nm", "Bandpass Wavelength Division Multiplexer—Narrowband", "Bandpass Wavelength Division Multiplexer" 1533/1557 nm–3 ports, pp. 46, 49, 50, and cover page of E–TEK Dynamics, Inc. 1997 Catalog.
Specification Pages for: "Narrowband Filter WDM" and "Broadband Filter WDM" cover page and pp. 25–28 of DiCon Fiberoptics, Inc. '96–'97 Fiberoptic Products Product Catalog.
Product Information and Applications Pages for "ONS–100 Optical Networking System" "A Sampling of Other ONS–100 Plug–in Modules", "ONS–100 Optical Fiber Amplifiers Applications and Advantages", four unnumbered pages from 5/97 publication of Bosch Telecom, Inc., 9201 Gaither Road, Gaithersburg, MD 20877–1439.

* cited by examiner

Primary Examiner—Leslie Pascal
Assistant Examiner—Agustin Bello
(74) Attorney, Agent, or Firm—Flehr Hohbach Test Albritton & Herbert LLP; R. Michael Ananian

(57) ABSTRACT

A four-port Wavelength-Division-Multiplexing (WDM) element is disclosed that can be employed for various purposes in optical communication networks, particularly in bi-directional fiber optic lines. In one embodiment, one four-port WDM element is used with one optical amplifier to provide bi-directional propagation on the same fiber. In another embodiment, the four-port element is used in conjunction with optical attenuators to provide for gain equalization of channels and the flexibility to add or remove channels. In yet another embodiment, input and output ports are added to current-art elements thereby enabling bi-directional operation to be achieved with equipment that does not provide such capabilities.

33 Claims, 10 Drawing Sheets

MULTI-PORT OPTICAL MULTIPLEXER ELEMENT

This invention pertains to fiber communication systems and more particularly to the transmission and routing of several multiplexed wavelengths on fiber carrying light simultaneously in two directions of propagation.

BACKGROUND OF THE INVENTION

Fiber optic networks include a variety of optical components such as transmitters, receivers, optical amplifiers and Wavelength Division Mulitplexers (WDMs). The amount of data that can be transmitted by these networks depends on the equipment bandwidth and the optimization of all the parts to support this bandwidth. Recently, service providers have had to double their system's capacity approximately every three years due to the increases in communication traffic. A common method of increasing network capacity and system bandwidth is to upgrade the Time Division Multiplexed (TDM) equipment along the transmission path. For example, 10 Gbit/sec systems are being installed today for high-speed networks, replacing slower speed channels with data rates such as 622 Mbit/sec. Another cost effective means for increasing system bandwidth is to install equipment for wavelength division multiplexing (WDM).

In a WDM system, multiple wavelengths ki (where "i" is an integer index) are transmitted on the same fiber, and each wavelength is used as an optical carrier for a TDM channel, such as a 2.5 or 10 Gbit/sec channel. All channels pass through similar optical components, such as fibers, WDMs and inline amplifiers. One important parameter in optical networks is the optical gain and loss experienced by individual channels as they propagate from the transmitting to the receiving station. For amplifiers, this parameter is termed Amplifier Gain Flatness. An asymmetry in net gain or loss between these channels leads to a reduction in overall system performance. Hence it is important to equalize and reduce the total loss of these channels as well as reduce the asymmetry in overall amplifier gain when all channels are present simultaneously, including when certain channels arbitrarily disappear due to equipment failure.

Channel routing is often performed in WDM networks. A common routing method shown in FIG. 1A employs three-port WDM elements, each with three ports P1, P2, P3 and an internal filter F1. These elements are available commercially from companies such as E-Tek of San Jose, Calif. and DiCon Fiberoptics of Berkley, Calif. If more than one channel is to be routed, then several of these elements are cascaded serially. However, channels that are routed first pass through fewer components and hence have less loss than those routed later. Hence, channel losses are asymmetric, when reduces overall system performance, particularly if channels are added later to the network. FIG. 1B shows how several three-port WDM elements are integrated into a single multi-channel element for routing four wavelengths k1, k2, k3, k4 through six pots P1–P6. Such elements have the same disadvantages as the three-port element of FIG. 1A. Multi-channel elements of this type are available from companies such as Optical Corporation of America of Marlborough, Mass.

It is generally accepted that network configurations that allow bi-directional transmission on the same fiber offer several advantages. Referring to FIG. 2, there is shown a prior art, bi-directional amplifier system, disclosed in U.S. Pat. No. 5,604,627 (Kohn), that employs two three-port WDM elements. In this system, wavelength bands k1 and k2 are defined for each direction of propagation and the three-port WDM elements WDMi are configured to deflect a respective wavelength band ki from a common input port to the appropriate optical amplifier Ai. The disadvantage of this model is that it requires the use of two amplifiers and two WDM elements for bi-directional operation on the same fiber, which in-turn increases system complexity and cost.

Referring to FIG. 3, there is shown a less-costly system configuration that is employed by BOSCH in its ONS-100 Optical Networking System. In this system, one amplifier and four three-port WDM elements are used in such a manner that the optical signal is transmitted through the amplifier in the same direction, regardless of the direction of transmission in the network, i.e. east to west or west to east. This configuration allows for bi-directional propagation on the same fiber using only one amplifier. However, the BOSCH system also increases the number of required WDM elements from two to four. The elimination of an expensive amplifier element reduces system cost, but doubling the number of WDM elements pushes system cost back up again.

Advantage of bi-directional amplifiers and a specific embodiment of a bi-directional amplifier configuration are also disclosed in U.S. Pat. No. 5,633,741 (Giles). Giles teaches the use of two four-port optical circulators C1 and C2 in conjunction with fiber gratings G1 and G2 and amplifiers A1 and A2 to achieve a bi-directional amplifier system as shown in FIG. 4. The disadvantage in such a method is that optical circulators, which are commercially available from companies such as JDS Fitel of Nepean, Canada, and The Kaifa Group of Sunnyvale, Calif., are complex and costly optical elements. The complexity of optical circulators and fiber gratings, in addition to the doubling in required number of components for bi-directional operation leads to an increase in overall system complexity and cost. Fiber gratings are specialized optical components and are commercially available from companies such as Lucent Technologies of Allentown, Pa.

The drawback of the devices shown in the prior art is their failure to provide a low-cost system (e.g., by minimizing the number of parts) or to enable the control of multi-channel gain and loss equalization for bi-directional operation on the same fiber. The objectives of this invention are therefore: (1) to reduce overall system cost by reducing the number of deployed amplifier and WDM elements and simplifying their manufacturability, (2) to equalize the losses incurred by all channels using alternate configurations, regardless of which channels are added or changed in the future, and (3) to provide a provision to flatten net amplifier gain for all wavelengths by incorporating other optical elements such as attenuators. It is a further objective of this invention to remedy the general drawbacks described in the background section.

SUMMARY OF THE INVENTION

In summary, the present invention is a four-port WDM element and a number of variations thereof that can be used as a principal component of a bidirectional optical amplifier.

In particular, the four-port WDM elements of the present invention can be used to add/remove any arbitrary channel or number of channels to/from a WDM communications network while maintaining similar insertion losses for all propagating channels. In one embodiment, attenuators and/ of filters are employed by the WDM element to flatten the gain profile of any amplifier in which the WDM is incorporated. A four-port WDM element can be combined with a single amplifier element to form a bi-directional optical amplifier. Advantages of such an optical amplifier include: reduced cost due to simplified design, equalized losses of all channels, and flattened amplifier gain across all wavelengths.

An internal configuration of a basic embodiment of a four-port WDM element is shown in FIG. 5A. This WDM element resembles an "X", where each optical port Pi lies along a respective arm of the "X" and a filter F is inserted at the intersection of the arms. Light launched into a first port (e.g., P1) is directed to the filter F, which selectively reflects certain channels or wavelengths to a receiving second port (e.g., P2). A third port (e.g., P3) receives the channels in the light launched into the first port P1 that are transmitted by the filter F. Similarly, light that is launched into the third port P3 is partially transmitted to the first port P1 by the filter F. The other channels in the light launched into the third port P3 are reflected by the filter F and are collected by a fourth port (e.g., P4). The resulting four-port WDM is symmetrical, meaning that light launched into the second and fourth ports behaves analogously to light launched into the first and third ports, respectively.

The present invention also includes various embodiments of bi-directional optical amplifiers that can be formed using the WDM elements of the present invention. In a basic bi-directional optical amplifier embodiment, shown in FIG. 7, the second and third ports of the WDM are coupled to an amplifier element A1. The ports P1 and P4 receive communication signals traveling in opposite directions. Each input signal can include multiple channels at different wavelengths. The filter characteristics are selected so the light input to the first port P1 is reflected to the second port P2 and then amplified by the amplifier element A1. The light input to the fourth port P4 is transmitted by the filter to the second port P2 and then passes through the amplifier A1 in the same direction as the light input to the first port P1. Thus, the four port WDM of the present invention enables the implementation of a bi-directional amplifier that requires only one WDM and one amplifier element.

Other disclosed embodiments of bi-directional amplifiers can be used to attenuate or add selected channels and amplify any number of channels.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1A:
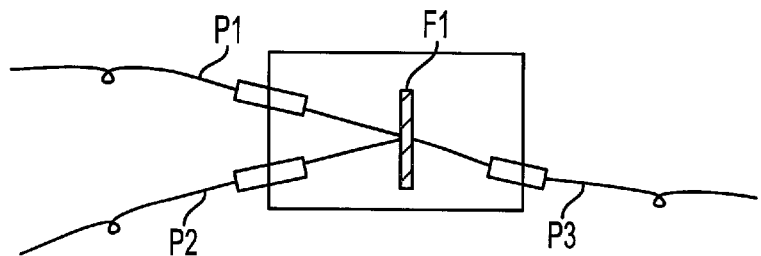
FIG. 1A shows a prior art WDM element that includes three ports P1, P2, P3 and a filter F.
Figure 1B:
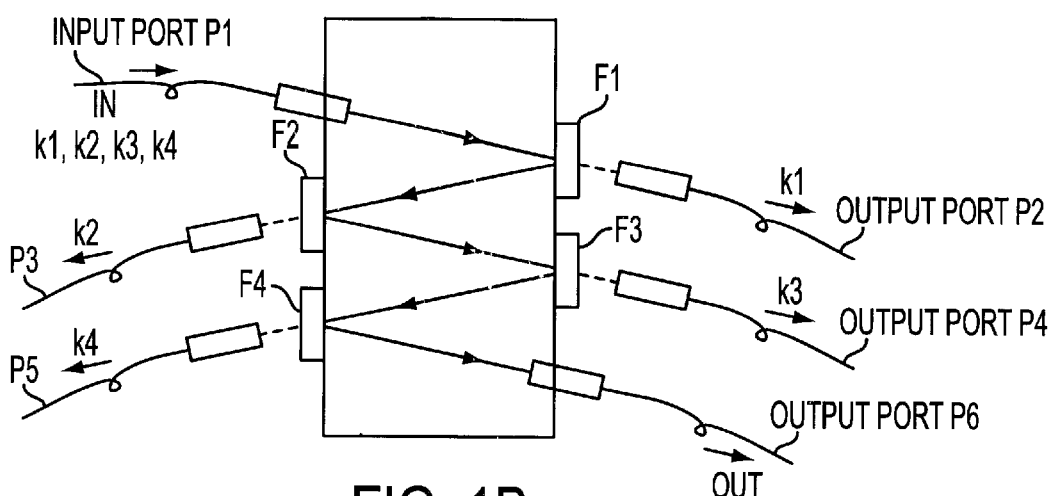
FIG. 1B shows a multi-port WDM element built using the three-port WDM element of FIG. 1A.
Figure 2:
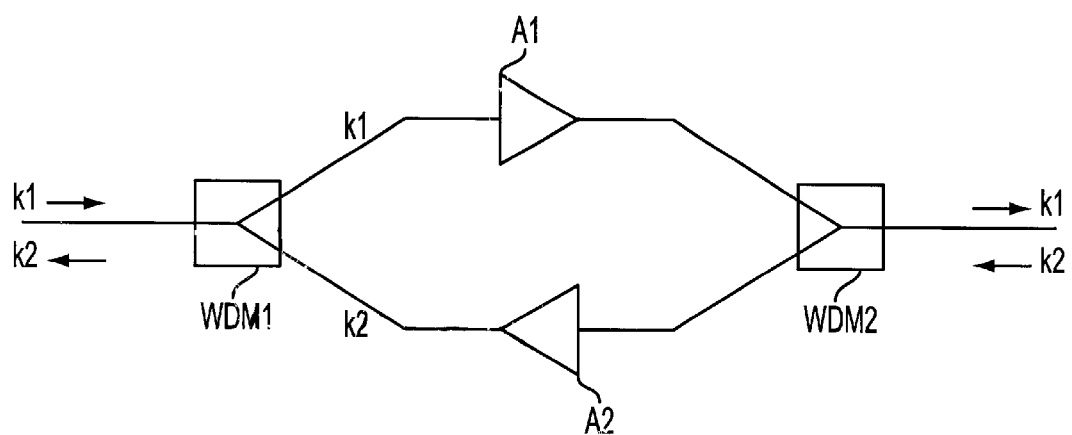
FIG. 2 shows a prior art bi-directional amplifier built using two three-port WDM elements WDM1 and WDM2 and two amplifiers A1 and A1.
Figure 3:
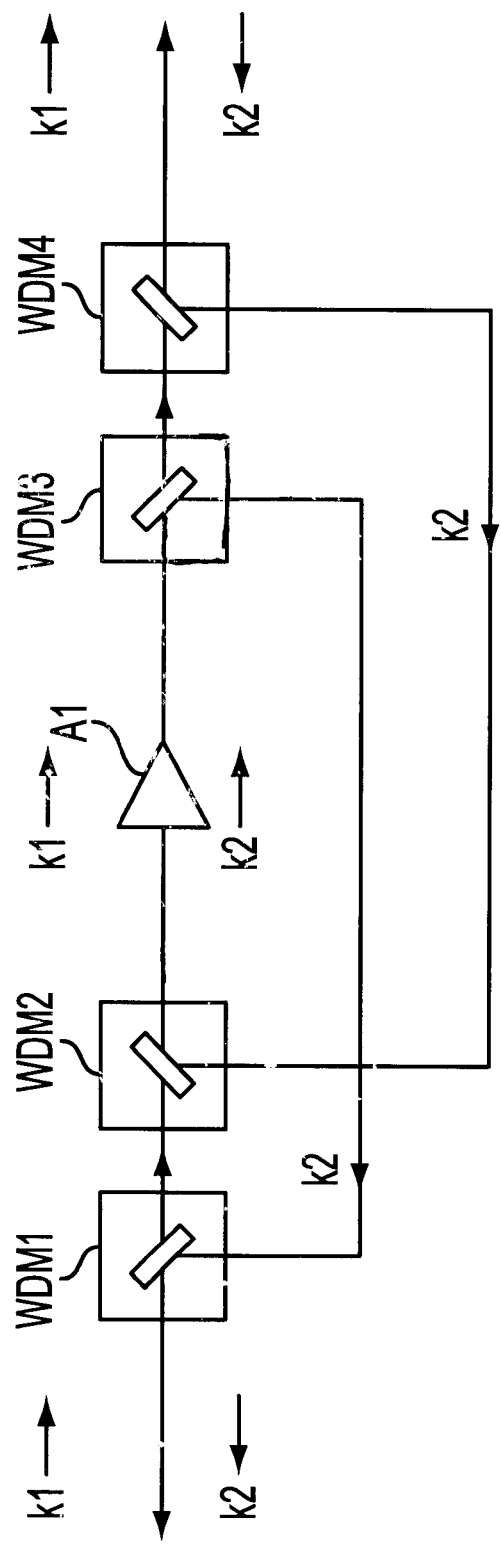
FIG. 3 shows a prior art bi-directional amplifier using four three-port WDM elements WDM1–WDM4, and one amplifier A1.
Figure 4:
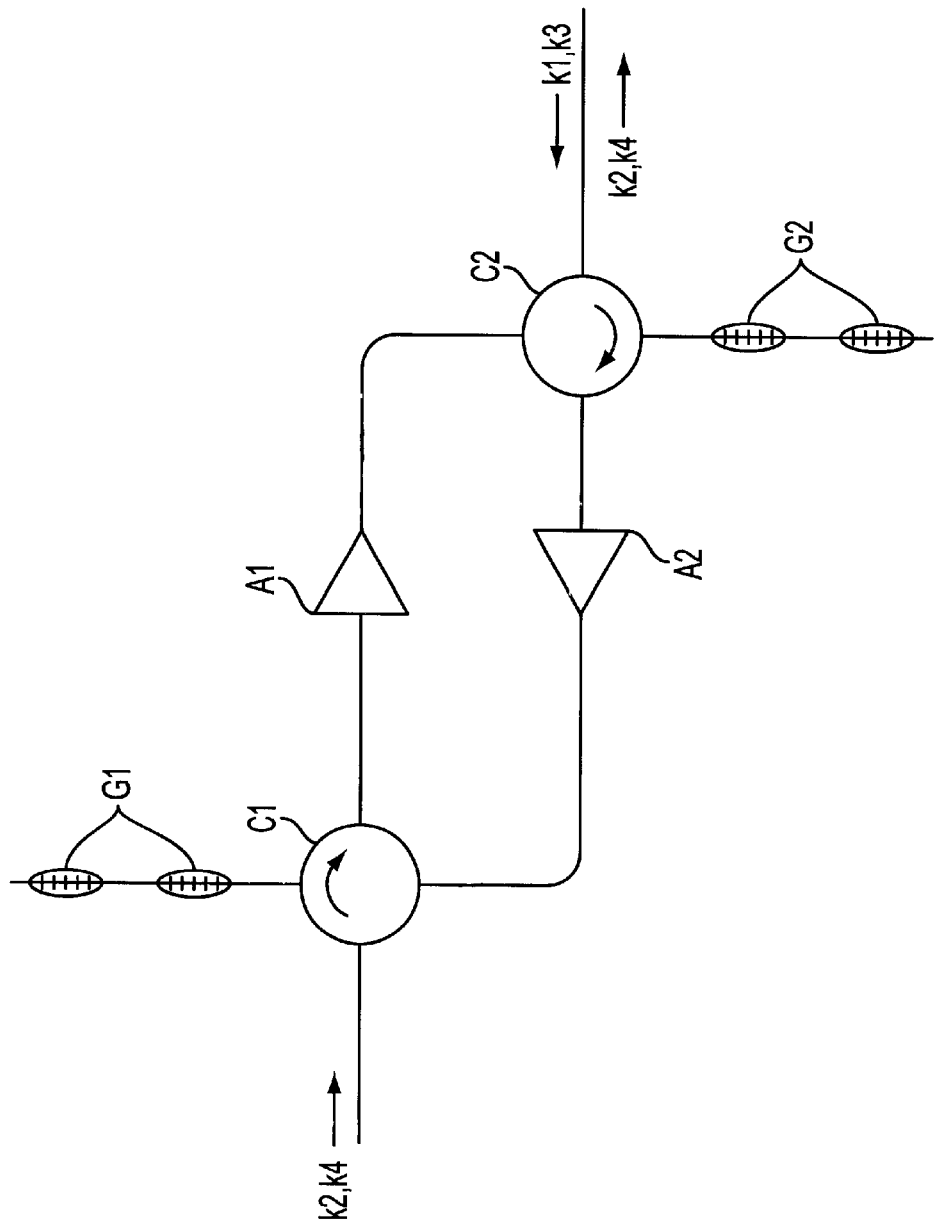
FIG. 4 shows a prior art bi-directional amplifier using two four-port optical circulators C1 and C2 and two amplifiers A1 and A2 with fiber gratings G1 and G2 for gain flattening.
Figure 5A:
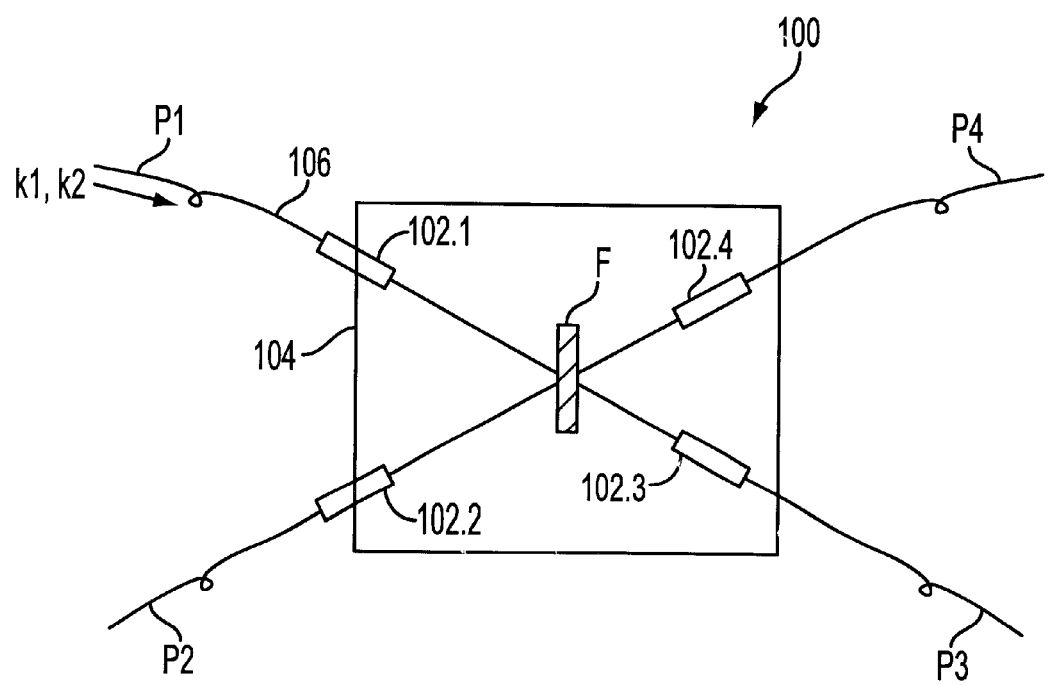
FIG. 5A shows a preferred embodiment of a four-port WDM element (with ports P1 to P4 and a filter F) in accordance with the present invention.

FIG. 5A shows a schematic of a preferred embodiment of a four-port WDM element 100 that includes four fiber optic collimators 102.1, 102.2, 102.3, 102.4; a filter F and four ports P1, P2, P3, P4. Each collimator 102 includes a collimating lens 104 and a fiber 106, which can be single- or multi-mode fiber. The collimators 102 are all coupled to the filter F. The transmission characteristics of the filter F determine whether it transmits or reflects a particular channel or channels received from the collimators 102. Typically, the filter's transmission characteristics are selected so that particular wavelengths are routed through the WDM in a particular direction. For example, the transmission band of the filter F can be defined so that signals of wavelength k1 are reflected and signals of wavelength k2 are transmitted. Assuming such a filter F and signals at the respective wavelengths k1 and k2 input to the port P1, the signals at k1 would be reflected by the filter F to the port P2 and the signals at k2 would be transmitted by the filter F to the port P3.

More generally, light out of the collimator 102.1 that is reflected by the optical filter F is received by the collimator 102.2. Light from the collimator 102.1 that is transmitted through the filter F is received by the collimator 102.3. In addition, light from the collimator 102.2 that is transmitted through the filter F is received by the fourth collimator 102.4. Light signals input at the ports P4 and P3 behave in the WDM element 100 analogously to light input at the first and second ports P1 and P2, respectively.

Figure 5B:
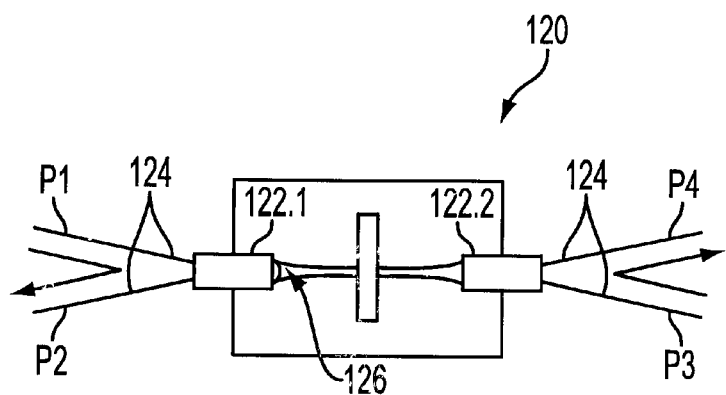
FIG. 5B shows a simplified configuration of the four-port WDM of FIG. 5A.

FIG. 5B shows an alternative configuration 120 of the invention shown in FIG. 5A. This configuration uses two collimating lenses 122.1 and 122.2 and four fibers 124 bundled into holders at each end of the lenses 122 to form the four ports P1, P2, P3, P4. In this configuration, the angle 126 between ports P1 and P2 and between the ports P3 and P4 are highly reduced. This configuration offers ease of manufacturing, cost reduction, and size reduction, reduction of thermal sensitivity and reduction of incidence angle onto the filter, which in turn reduced polarization dependent losses (PDL). PDL is an important parameter that is always desired to be small for proper network operation.

Figure 6A:
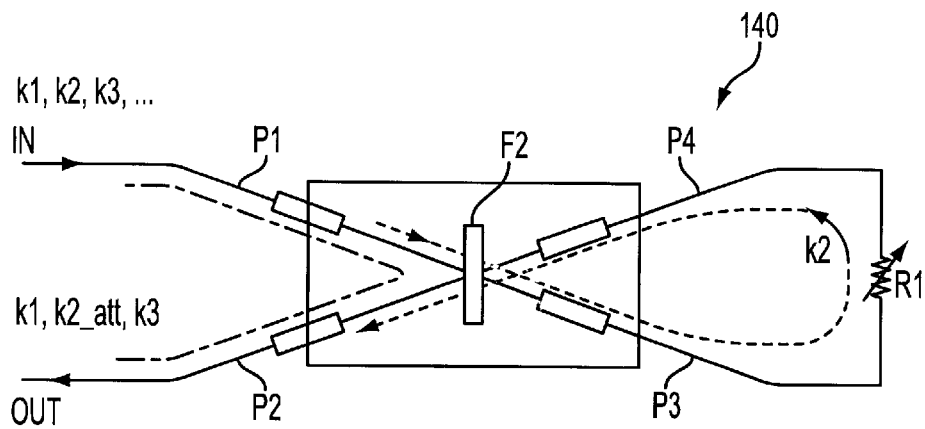
FIGS. 6A and 6B show alternative embodiments of the present invention shown in FIGS. 5A and 5B, where variable optical attenuators R1 and R2 and ports P5 and P6 are added to selectively attenuate channels for gain flattening applications of optical amplifiers.
Figure 6B:
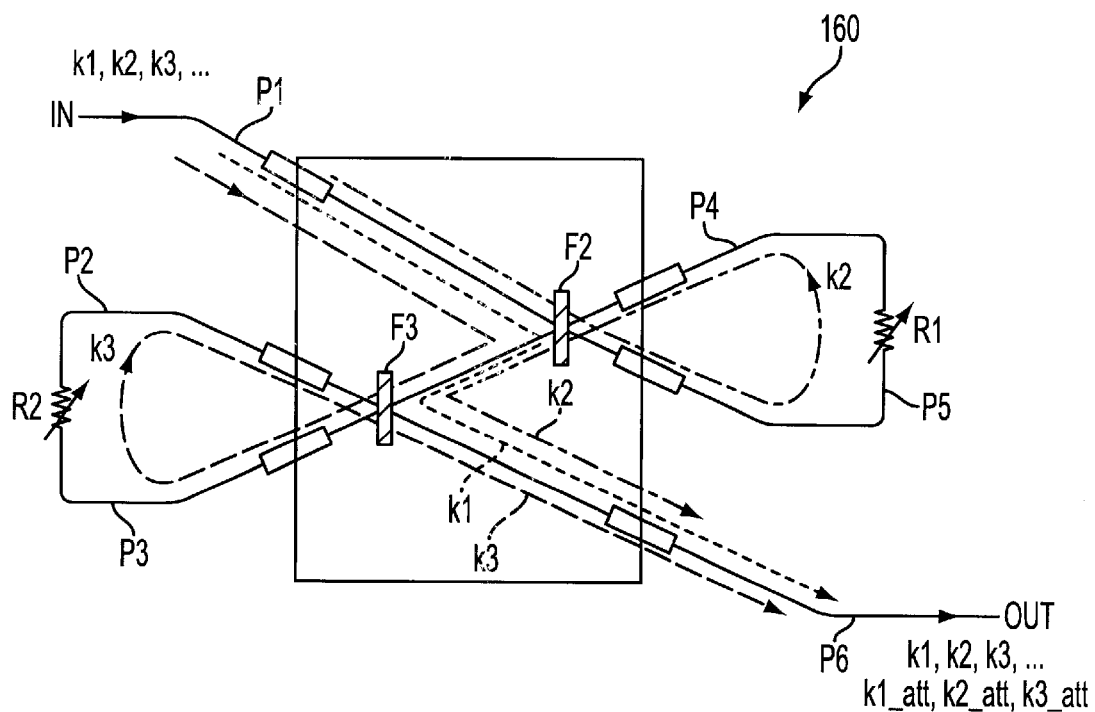

FIGS. 6A and 6B show alternative embodiments that use variable attenuator Ri and selective filters Fi to attenuate signals of a particular wavelength ki. Each of these embodiments, and subsequent embodiments, shows a four-port WDM configured as shown in FIG. 5A; however, any of the embodiments disclosed herein can also employ the four-port WDM configuration of FIG. 5B or an equivalent of either configuration.

In particular, FIG. 6A shows an embodiment 140 of a four-port WDM element that can be used to control the power of a specific wavelength, for example k2. The embodiment 140 includes four ports P1–P4, a filter F2 and a variable attenuator R1 connected between the ports P3 and P4. For exemplary purposes, assume that the signals input to the port P1 are at a plurality of wavelengths, including k1, k2 and k3. In the illustrated embodiment, the filter F2 is configured to transmit only the wavelength k2 and reflect all other wavelengths. In a WDM element so configured all wavelengths ki received by the port P1 are routed to the port P2 except for the wavelength k2, which is routed to the port P3, where it encounters the attenuator R1. After it is attenuated, the wavelength k2 is routed through the port P4, filter F2 and port P2 to join the rest of the wavelength stream as the attenuated wavelength k2_att.

Figure 6C:
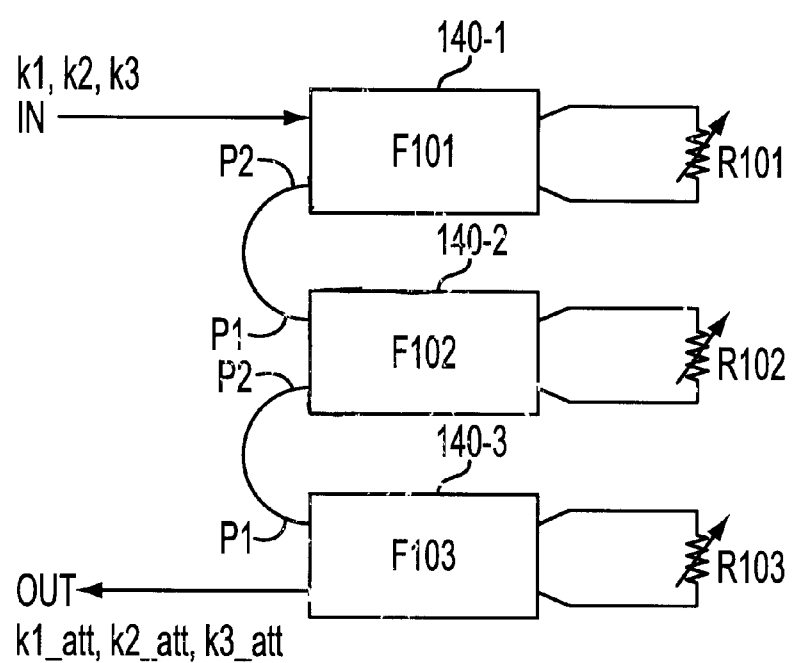
FIG. 6C illustrates an embodiment of the present invention where elements 140 from FIG. 6A are serially connected.

The attenuation of multiple wavelengths can be controlled by serially connecting a number of the elements 140 shown in FIG. 6A. For example, referring to FIG. 6C, if three elements 140-1, 140-2, 140-3 are connected in series, then port P2 of the first element would be connected to P1 of the second element, and port P2 of the second element would be connected to port P1 of the third element. Assume that attenuators R101 to R103, and filters F101 to F103 are used in these elements, respectively. All wavelengths enter the system at the first port P1 of the first element and exit at P2 of the third element. Assuming that filters F101 to F103 are configured to transmit wavelengths k1 to k3 and reflect everything else, then as these wavelengths are routed through the system they encounter their respective attenuators in a manner similar to that described for FIG. 6A. Each wavelength is therefore selectively attenuated by its corresponding attenuator making it possible to selectively attenuate each wavelength arbitrarily without affecting the other wavelengths.

Although the schematic of FIG. 5A consists of four collimators and an optical filter, the four-port element that is disclosed in this invention is not limited to such a configuration. For example, FIG. 6B shows a six-port WDM 160 that adds additional ports P5, P6 and a filter F3 to the configuration 140 of FIG. 6A. This six-port WDM element 160 enables one to independently control transmission losses for the wavelengths k2 and k3, for example. In this case the filter F3 is configured to transmit the wavelength k3 and reflect all other wavelengths. Any wavelength (other than the wavelengths k2 and k3) input to the port P1 is deflected by the filters F2 and F3 to port P6. The wavelengths k2 and k3 are separately routed to the attenuators R1 and R2, respectively. In particularly, the wavelength k1 is routed as follows: P1-F2-F3-P6 (meaning port 1 to filter 2 to filter 3 to port 6). The wavelength k2 is routed as follows: P1-F2-P5-R1-P4-F2-F3-P6. The wavelength k3 is routed as follows: P1-F2-F3-P3-R2-P2-F3-P6.

Figure 7:
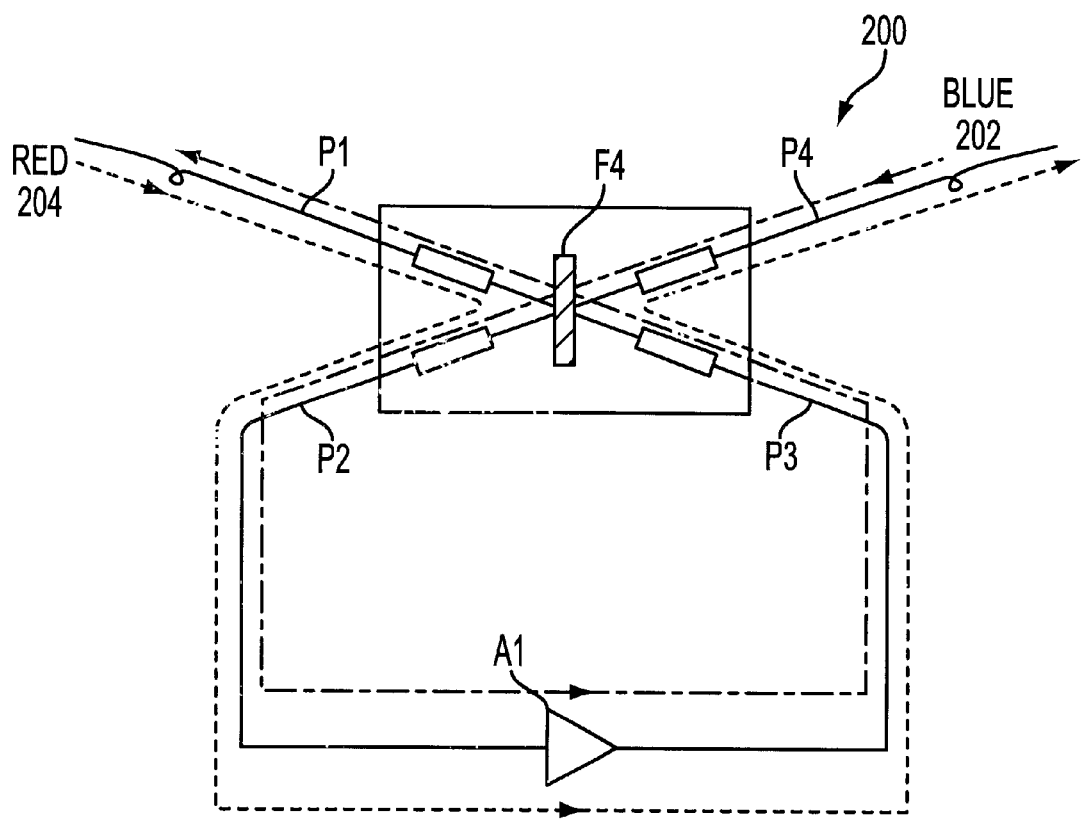
FIG. 7 shows an alternative embodiment of the present invention, a bi-directional amplifier.

The four-port WDM elements of FIG. 5A may also be used to build a bi-directional amplifier 200, shown in FIG. 7, which, in addition to the four ports P1–P4 and filter F4, includes an amplifier A1 connected to ports P2 and P3. Assume for illustrative purposes that the filter F4 reflects red light and transmits blue light. Assume also that in the network in which the element 200 is employed blue light 202 propagates east to west, entering the element 200 at the port P4 and red light 204 propagates in the opposite direction, entering the element 200 at the port P1. Consequently, the blue light 200 that enters at the port P4 is transmitted through the filter F4 to the port P2, passes through the amplifier A1 to the port P3, is transmitted through the filter F4, exits at the port P1 and continues its east-west propagation. On the other hand, the red light 204 that enters at the port P1 is reflected by the filter F4 to the port P2, passes through the amplifier A1 to the port P3, is reflected by F4 to port P4 and continues on its west-east propagation.

Note that the filter F4 in FIG. 7 is chosen such that the wavelengths that are reflected and transmitted both reach the input end of the amplifier A1. The reverse filter, reflecting blue light and transmitting red, could be used if the input/output orientation of the amplifier A1 were reversed. The four-port WDM element of the present invention therefore offers the flexibility of implementing the filter F4 using transmission or reflection filters. Comparing the present invention to the bi-directional amplifiers of FIGS. 2–4 and 7, note that the system of FIG. 7 minimizes the parts used. This offers a major advantage in cost and complexity reduction in networks.

The WDM elements shown in FIGS. 5A and 5B are building blocks that can be connected together in any number so that any combination of channel wavelengths, or channel wavelength bands, regardless of their direction of propagation, can be added or eliminated from networks. Referring to FIG. 8, there is shown an alternative embodiment 220 of the current invention, where three four-port elements WDM5, WDM6, WDM7 are used with one amplifier A1 and three filters F6, F8, F10 to form an expandable, bi-directional amplifier configuration. In the illustrated embodiment the filters F6, F8 and F10 in elements WDM5, WDM6, WDM7 are respectively configured to transmit even-labeled wavelengths (e.g., k6, k8, k10) and reflect everything else. For example, referring to FIG. 8B, which shows the reflection and transmission spectra of the filter F10, the transmission spectra is high only for the wavelength k10. Note that the choice of labeling of wavelengths is arbitrary and is not necessary for proper operation of this amplifier block. The routing in the amplifier 220 of the various input channels k5–k10 is now described.

Figure 8A:
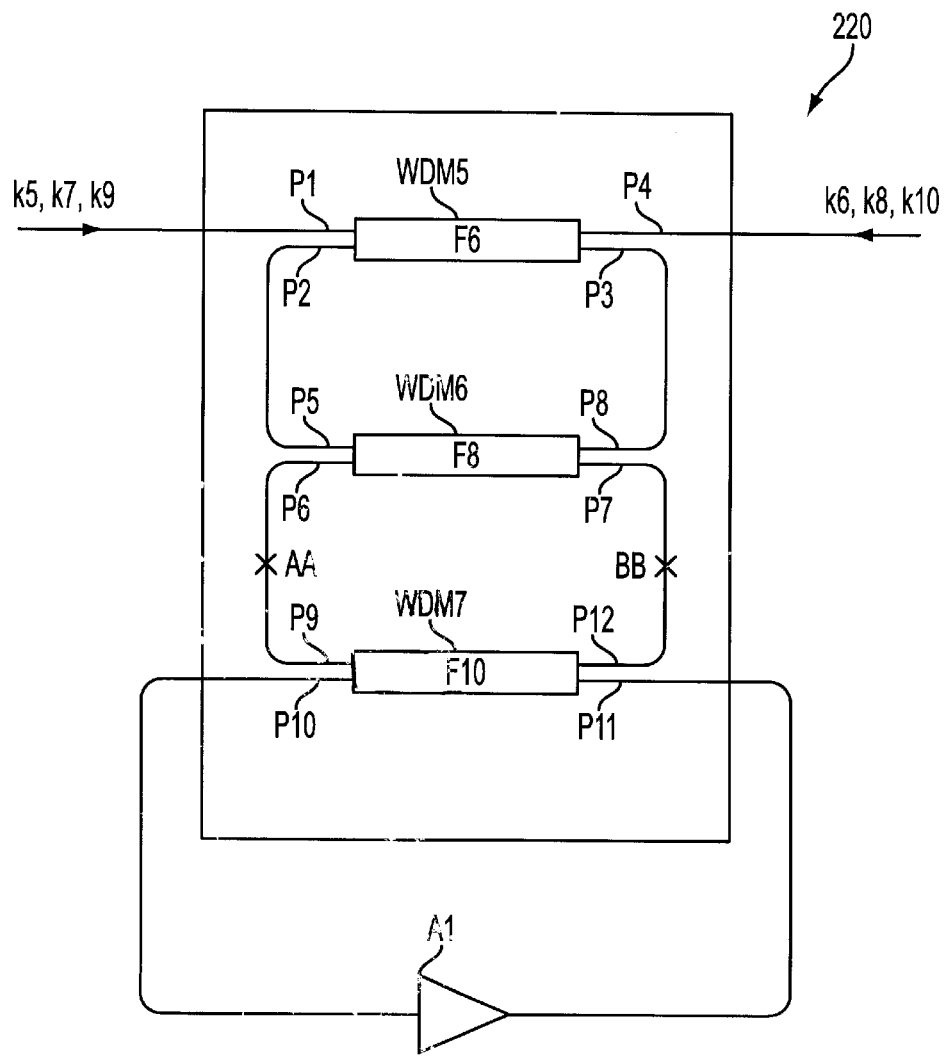
FIG. 8A shows an alternative embodiment of the present invention, employing a single amplifier and three four-port WDM elements that are connected together to achieve bi-directional operation for a number of multiplexed channels.
Figure 8B:
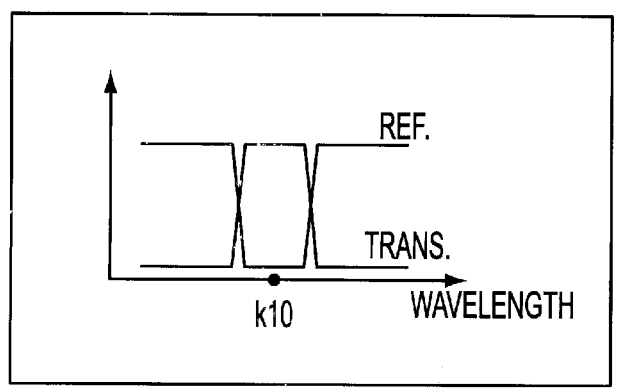
FIG. 8B shows an exemplary transmission schematic for the filter used in the four-port WDM element WDM7 of FIG. 8A.

The odd-labeled, west-to-east propagating channels k5, k7 and k9 enter the amplifier 220 at the port P1 of FIG. 8A. Each of these channels is routed as follows: P1-P2-P5-P6-P9-P10-A1-P11-P12-P7-P8-P3-P4. All channels k5, k7, k9 exit at the port P4 and continue the eastward path. The channel k6 enters at the port P4 is routed as follows: P4-P2-P5-P6-P9-P10-A1-P11-P12-P7-P8-P3-P1, and continues on its westward path. Similarly, the channel k8 enters at the port P4 and is routed as follows: P4-P3-P8-P6-P9-P10-A1-P11-P12-P7-P5-P2-P1, and continues on its westward path. The routing of the channel k10 follow from the previous descriptions. Note that all channels k5–k10 are routed through the amplifier A1 in the same direction. Channels other than k6, k8 and k10 entering the port P4 are blocked by the amplifier A1.

The configuration of FIG. 8A may be upgraded if an additional channel wavelength or bands of channel wavelengths are added to the network at a later time. This update can be effected by simply splicing-in (e.g., at the indicated "AA"-"BB" marks) an additional four-port WDM element with an internal filter element configured to transmit the new channel wavelength or band. Furthermore, any channel can be reversed in its direction of propagation by reversing the orientation of the corresponding four-port WDM element.

This capability to add/reduce and reverse direction enhances the flexibility of network architectures.

Note that, in the disclosed embodiments, all channels that are propagating in the same direction are reflected and transmitted the same number of times. If the four-port elements of FIG. 5B are designed to have similar insertion loss specifications for all channels, it follows that all channels will experience similar insertion losses, which eliminates problems of asymmetry between wavelengths as they pass through different set of network elements. In addition, if insertion loss specifications for the channels that are transmitted through the filters of these four-port elements are similar to those of reflected channels, then it follows that east-west channels and west-east channels would have similar insertion losses. This further decreases the asymmetry to all channels.

Furthermore, when additional channels are added to the network by splicing-in additional four-port elements, it follows that the total insertion loss for all channels will be effected in a similar manner, without preferentially improving or degrading particular channels. This flexibility in circuit connectivity is beneficial, particularly in WDM networks that use bi-directional propagation on the same fiber. There are numerous applications of four-port WDM elements.

Figure 9:
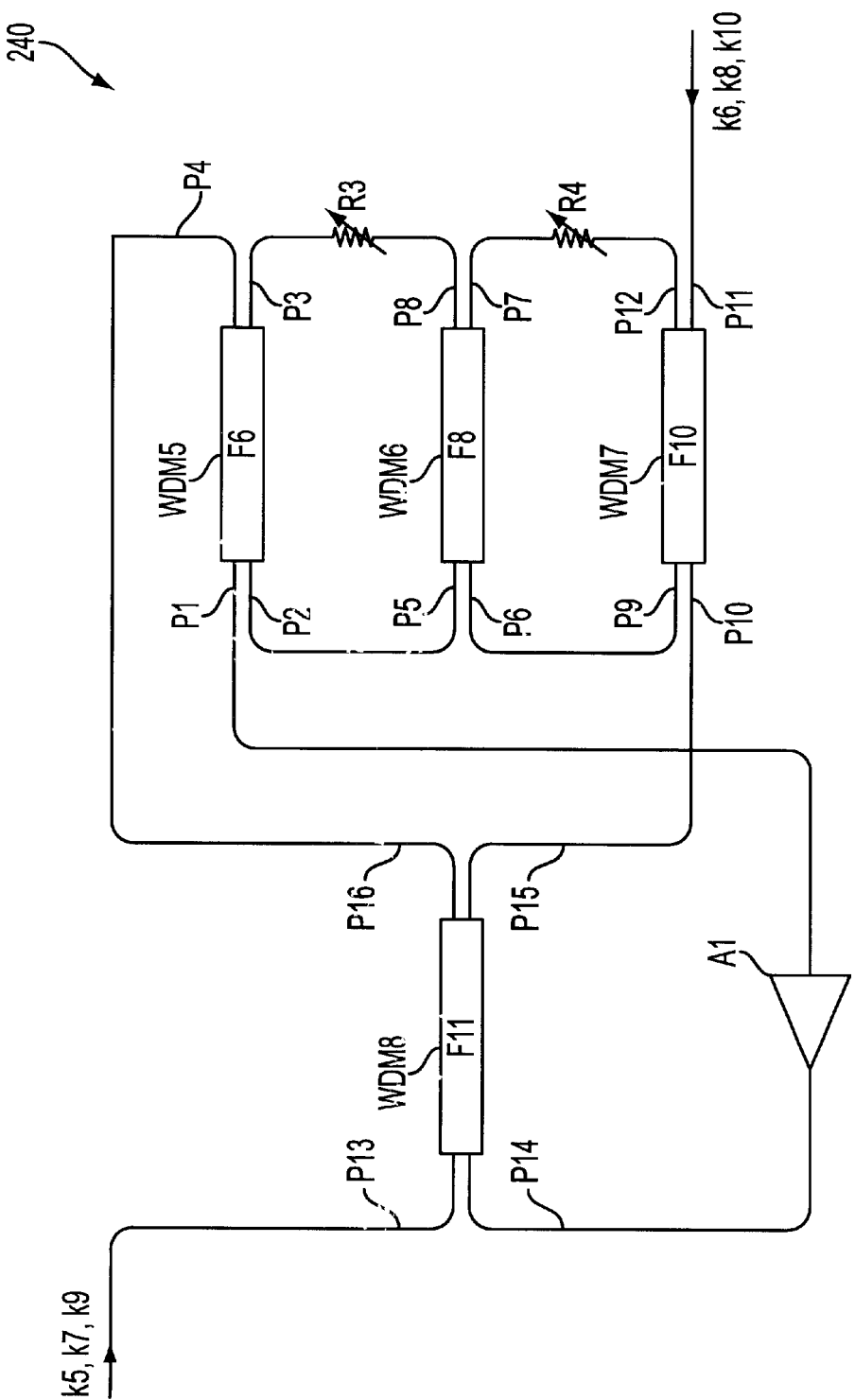
FIG. 9 shows an alternative embodiment of the present invention which operates as a bi-directional and gain flattened amplifier and employs one amplifier, four four-port elements and optical attenuators.

Referring to FIG. 9, there is shown an alternate configuration 240 of the current invention. This configuration employs four four-port elements WDM5–WDM8, two optical attenuators R3, R4 and one optical amplifier A1 to form a bi-directional, gain flattened amplifier. In this configuration, odd-labeled channels (k5, k7 and k9) are transmitted west to east, and even channels (k6, k8 and k10) are transmitted east to west. The elements WDM5–WDM7 are identical to those shown in FIG. 8A, having similar port labeling and internal filters F6, F8 and F10 that respectively transmit the wavelengths k6, k8 and k10 while reflecting everything else. The WDM8 has four ports P13, P14, P15, P16 and a filter F11 that transmits all odd labeled channels and reflects everything else. The routing in the amplifier 240 of the various input channels k5–k10 is now described.

The west-to-east propagating channels k5, k7 and k9 are routed as follows: P13-P15-P10-P9-P6-P5-P2-P1-A1-P14-P16-P4-P3-R3-P8-P7-R4-P12-P11 and continue on their eastward path. The channel k6 is routed as follows: P11-P12-R4-P7-P8-R3-P3-P1-A1-P14-P13 and continues westward. The channel k8 is routed as follows: P11-P12-R4-P7-P5-P2-P1-A1-P14-P13 and continues westward. The channel k10 is routed as follows: P11-P9-P6-P5-P2-P1-A1-P14-P13 and continues westward. By comparing these routings note that the odd channels k6 encounter an additional loss provided by the attenuators R3+R4, while the channel k8 experiences an additional loss provided by the attenuator R4 only and the channel k10 experiences no additional loss. Such asymmetrical loss configurations allow for example to compensate for uneven gain that is experienced by channels passing through a network.

Another advantage offered by the present invention is that of upgrading single-direction networks to bi-directional operation. This can be accomplished with relatively little expense and additional complexity by inserting four-port WDMs designed in accordance with the present invention at the inputs and outputs of each amplifier stage, routing point, or other junction.

Modifications and variations may be made to the disclosed embodiments without departing from the subject and spirit of the invention as defined by the following claims.

What is claimed is:

1. A multi-port wavelength division multiplexing (WDM) element, comprising:
    ports configured to couple the WDM element to a respective set of external optical fibers capable of carrying light signals at a plurality of wavelengths; and
    a discrete filter element separate from but optically coupleable to the external optical fibers having first and second substantially planar parallel filter surfaces, a filter body defined between the first and second filter surfaces, and transmission and reflection bands configured to:
        couple first light signals input at a first port to a second port by reflection at the first filter surface, the first light signals having first wavelengths that are within the reflection band of the discrete filter element;
        couple second light signals input at the first port to a third port by transmission through the first surface, the filter body, and the second surface, the second light signals having second wavelengths that are within the transmission band to the filter element;
        couple third light signals input at the third port to a fourth port by reflection at the second filter surface, the third light signals having third-wavelengths that are within the reflection band of the filter element; and
        couple fourth light signals input at the third port to the first port by transmission through the second surface, the filter body, and the first surface, the fourth light signals having fourth wavelengths that are within the transmission band of the filter element.

2. The multi-port WDM of claim 1, further comprising:
    a plurality of collimators coupled between the four ports and the filter element, the collimators being configured to receive a light signal from one of the external optical fibers, to collimate the received light signal input to the filter before it strikes the filter, and to uncollimate the light signals transmitted through the filter or reflected from the filter for output from the ports for entry into the external optical fibers.

3. The multi-port WDM of claim 2, wherein:
    the plurality of collimators comprise two collimators with substantially coincident collimation axes;
    wherein a first of the collimators is coupled to the first and second ports; and
    a second of the collimators is coupled to the third and fourth ports.

4. A element is in claim 1 wherein the first and second wavelengths are the same and the third and fourth wavelengths are the same.

5. The multi-port WDM of claim 1, further comprising:
    a plurality of collimators coupled between the four ports and the filter element;
    a first collimator being configured to receive light signals input from one of said external optical fibers at one of the ports, collimate and communicate the received light signal to the discrete filter; and
    a second collimator to receive the transmitted or reflected light signal from the filter and uncollimate and output the light signal transmitted through or reflected by the filter to another one of the external optical fibers at a different one of the ports.

6. The multi-port WDM of claim 1, wherein the multi-port WDM comprises a four-port WDM.

7. The element in claim 1, further comprising a unidirectional amplifier connected between the second and third port to amplify signals transmitted in the direction of amplification between the ports.

8. The multi-port WDM of claim 1, further comprising:
unidirectional amplifier connected between the second and third port to amplify signals transmitted in the direction of amplification between the ports; and
a plurality of collimators coupled between the four ports and the filter element, the collimators being configured to receive a light signal from one of the external optical fibers, to collimate the received light signal input to the filter before it strikes the filter, and to uncollimate the light signals transmitted through the filter or reflected from the filter for output from the ports for entry into the external optical fibers;
the plurality of collimators comprising first and second collimators with substantially coincident collimation axes, the first collimator is coupled to the first and second ports, and the second collimators is coupled to the third and fourth ports.

9. The element of claim 1, further comprising at least one collimator interposed in a light signal beam between the filter element and one of the external optical fibers.

10. The multi-port WDM of claim 2, wherein: the plurality of collimators comprise four collimators with respective collimation axes arranged in an X-shape, each of the collimators coupling a respective one of the ports to the filter element; wherein first and third collimators coupled respectively to the first and third ports are situated along opposing legs of the X-shape; second and fourth collimators coupled respectively to the second and fourth ports are situated along opposing legs of the X-shape; and the first and second collimators are situated along adjacent legs of the X-shape.

11. The multi-port WDM of claim 1, further comprising a first attenuator coupled between a first pair of the four ports, the attenuator being configured to attenuate first output signals output at one port of the first pair and couple the attenuated first output signals to the other port of the first pair.

12. The multi-port WDM of claim 11, wherein the filter element is configured to couple signals at only one selected wavelength to one port of the first pair, such that the signals at the selected wavelength are the only signals attenuated by the first attenuator.

13. The multi-port WDM of claim 11, further comprising a second attenuator coupled between a second pair of the four ports, the second attenuator being configured to attenuate second output signals output at one port of the second pair and couple the attenuated second output signals to the other port of the second pair.

14. The multi-port WDM of claim 13, wherein the filter is configured to couple signals at only one selected wavelength to the one port of the second pair, such that the signals at the selected wavelength are the only signals attenuated by the second attenuator.

15. The multi-port WDM of claim 14, wherein: the one selected wavelength comprises a first selected wavelength; and the filter is configured to couple signals at a second selected wavelength to the one port of the first pair; such that the signals at the second selected wavelength are the only signals attenuated by the first attenuator.

16. A method of operating a multi-port wavelength division multiplexing (WDM) element, comprising:
coupling the WDM element to a respective set of external optical fibers capable of carrying light signals at a plurality of wavelengths;
the WDM including a discrete filter element separate from said external optical fibers having first and second substantially planar parallel filter surfaces, a filter body defined between the first and second filter surfaces, and transmission and reflection bands configured to:
couple first light signals input at a first port to a second port by reflection at the first filter surface, the first light signals having first wavelengths that are within the reflection band of the discrete filter element;
couple second light signals input at the first port to a third port by transmission through the first surface, the filter body, and the second surface, the second light signals having second wavelengths that are within the transmission band of the filter element;
couple third light signals input at the third port to a fourth port by reflection at the second filter surface, the third light signals having third wavelengths that are within the reflection band of the filter element; and
couple fourth light signals input at the third port to the first port by transmission through the second surface, the filter body, and the first surface, the fourth light signals having fourth wavelengths that are within the transmission band of the filter element.

17. The method of operating the multi-port WDM of claim 16, further comprising:
a plurality of collimators coupled between the four ports and the filter element, the collimators collimating light signals input to and output from the ports.

18. A method as in claim 16 wherein the first and second wavelengths are the same and the third and fourth wavelengths are the same.

19. The method of operating the multi-port WDM of claim 16, wherein the WDM further includes a plurality of collimators coupled between the four ports and the filter element, including a first collimator and a second collimator;
the first collimator being configured to receive light signals input from one of said external optical fibers at one of the ports, and collimate and communicate the received light signal to the discrete filter; and
the second collimator to receive the transmitted or reflected light signal from the filter and uncollimated and output the light signal transmitted through or reflected by the filter to another one of the external optical fibers at a different one of the ports.

20. A method of operating a multi-port wavelength division multiplexing (WDM) element as in claim 16, further comprising: unidirectionally amplifying signals transmitted between the second and third ports.

21. The element of claim 16, further comprising at least one collimator interposed in a light signal beam between the filter element and one of the external optical fibers.

22. A multi-port wavelength division multiplexing (WDM) element for coupling light carrying signals at a plurality of wavelengths with a plurality of external optical fibers, the element comprising:
a discrete filter element formed separate from the external optical fibers having first and second substantially planar parallel filter surfaces, a filter body defined between the first and second filter surfaces, and transmission and reflection bands configured to:
couple first input light signals received from a first optical fiber to a second optical fiber by reflection at the first filter surface, the first light signals having first wavelengths that are within the reflection band of the discrete filter element;
couple second input light signals received from the first optical fiber to a third optical fiber by transmission through the first filter surface, the filter body, and the second filter surface, the second light signals having second wavelengths that are within the transmission band of the filter element;

couple third light input signals received from the third optical fiber to a fourth optical fiber by reflection at the second filter surface, the third light signals having third wavelengths that are within the reflection band of the filter element; and couple fourth light input signals input from the third optical fiber to the first optical fiber by transmission through the second filter surface, the filter body, and the first filter surface, the fourth light signals having fourth wavelengths that are within the transmission band of the filter element; and a plurality of collimators interposed in the light signal between the external optical fibers and the filter element, the collimators being configured to receive the light signal from one of the external optical fibers, to collimate the received light signal input to the filter before it strikes the filter, and to uncollimate the light signals transmitted through the filter or reflected from the filter for output from the ports for entry into the external optical fibers.

23. The multi-port WDM of claim 22, wherein:

the plurality of collimators comprise two collimators with substantially coincident optical axes, the optical axes passing through the filter element at substantially normal incidence;

a first of the two collimators being disposed and operable to receive a light signal input from the first and second external optical fibers and direct the received light signal to the filter element, and to receive a filtered light signal from the filter element and direct the filtered output signal to a wavelength selected one of the first and second optical fibers; and a second of the two collimators being disposed and operable to receive a light signal input from the third and fourth external optical fibers and direct the received light signal to the filter element, and to receive a filtered light signal from the filter element and direct the filtered wavelength selected output signal to one of the third and fourth optical fibers.

24. The multi-port WDM of claim 22, wherein each collimator collimates light entering the collimator from the external optical fibers passing through the collimator in one direction, and focuses the light passing through the collimator in the opposite direction.

25. The element of claim 22, further comprising at least one collimator interposed in a light signal beam between the filter element and one of the external optical fibers.

26. A bi-directional optical amplifier, comprising: a four-port wavelength division multiplexer (WDM), including: four ports configured to couple the WDM to a respective set of optical fibers capable of carrying light signals at a plurality of wavelengths; and a filter element configured to transmit light signals with wavelengths in a transmission band and to reflect light signals with wavelengths in a reflection band that is complementary to the transmission band, the filter element being situated in relation to the four ports to: couple first light signals input at a first port to a second port when the first light signals have wavelengths within the reflection band, couple the first light signals input at a third port to a fourth port when the first light signals have wavelength within the reflection band, couple second light signals input at a fourth port to the second port when the second light signals have wavelengths within the transmission band, and couple the second light signals input at the third port to the first port when the second light signals have wavelengths within the transmission band; and an amplifier element with an input coupled to the second port and an output coupled to the third port, the amplifier being configured to amplify the first and the second light signals from the second port and output the amplified first and second light signals to the third port.

27. The optical amplifier of claim 26, wherein the transmission and reflection bands of the filter are selected so that the wavelengths of the first signals are all within the reflection band and the wavelengths of the second signals are all within the transmission band, enabling the first and second light signals, which are input to the optical amplifier traveling in different directions, to travel through the amplifier element in one preferred direction between the second port and the third port.

28. The optical amplifier of claim 26, further comprising: a plurality of collimators coupled between the four ports and the filter element, the collimators being configured to collimate light signals input to and output from the ports.

29. The optical amplifier of claim 28, wherein: the plurality of collimators comprise four collimators with respective collimation axes arranged in an X-shape, each of the collimators coupling a respective one of the ports to the filter element; wherein first and third collimators coupled respectively to the first and third ports are situated along opposing legs of the X-shape, second and fourth collimators coupled respectively to the second and fourth ports are situated along opposing legs of the X-shape, and the first and second collimators are situated along adjacent legs of the X-shape.

30. The optical amplifier of claim 28, wherein: the plurality of collimators comprise two collimators with substantially coincident collimation axes; wherein a first of the collimators is coupled to the first and second ports, and a second of the collimators is coupled to a third and fourth ports.

31. The optical amplifier of claim 26, wherein a first and second signals each comprise i distinct-wavelengths, and where the four-port WDM comprises: a plurality i of WDMs interconnected so that: a first WDM has a first port configured o receive the first light signals and a fourth port configured to receive the second light signals; each of k WDMs (k=2 through i–1) has first port configured to receive light signals output from the second port of the (k–1)th WDM and a fourth port configured to receive light signals output from the third port of the (k–1)th WDM; and an ith WDM has a first port configured to receive light signals output from the second port of the (i–1)th WDM, a fourth port configured to receive light signals output from the third port of the (i–1)th, a second port coupled to the input of the amplifier element and a third port coupled to the output of the amplifier element; each of the WDMs having a respective filter configured to reflect a respective one of the i wavelengths of the first signals so that all of the first and second signals travel in the same preferred direction through the amplifier and exit the WDM in the same direction in which they entered the WDM.

32. A bi-directional, gain-shaped amplifier for use in an optical communication network where first signals propagate in a first directional and second signals propagate in a second, opposite direction, each of the first and second signals having a respective wavelength, comprising: an optical amplifier; a first four port WDM configured to transmit the first signals and to reflect the second signals, the first WDM having a first port configured to receive the first signals and a second port configured to receive amplified signals provided by the optical amplifier; an additional plurality of four port WDMs, each of the additional WDMs being configured to transmit only one of the second signals; a second of the additional WDMs having a first port configured to receive the second signals and a second port coupled to a third port of the first WDM; a third of the additional WDMs having a first port coupled to the input of the optical amplifier and a second port coupled a fourth port of the first WDM; the remainder of the additional WDMs have interconnected ports configured so that transmitted signals are routed through respective first pair of the interconnected ports and reflected signals are routed through a respective second pair of the interconnected ports; and a plurality of attenuators, each coupled between a respective one of the first pair of ports and being configured to attenuate a respective transmitted second signal by a particular amount so as to shape the gain of the amplifier; the additional WDMs being situated between and connected to the second and third additional WDMs so that all first and second signals, whether attenuated or not, are ultimately coupled to the input of the amplifier.

33. The bi-directional, gain-shaped amplifier of claim 32, wherein the attenuators are configured so that the gain of the amplifier is flattened.

* * * * *